US 8,244,995 B2

(12) United States Patent
Sauber

(10) Patent No.: US 8,244,995 B2
(45) Date of Patent: Aug. 14, 2012

(54) SYSTEM AND METHOD FOR HIERARCHICAL WEAR LEVELING IN STORAGE DEVICES

(75) Inventor: William Sauber, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 958 days.

(21) Appl. No.: 12/261,723

(22) Filed: Oct. 30, 2008

(65) Prior Publication Data

US 2010/0115178 A1 May 6, 2010

(51) Int. Cl.
*G06F 12/00* (2006.01)
(52) U.S. Cl. .......................... 711/158; 711/103
(58) Field of Classification Search .................. 711/103, 711/158
See application file for complete search history.

(56) References Cited

U.S. PATENT DOCUMENTS

| 6,850,443 B2 * | 2/2005 | Lofgren et al. .......... 365/185.29 |
| 7,865,761 B1 * | 1/2011 | Chilton ............................... 714/2 |
| 2009/0089483 A1 * | 4/2009 | Tanaka et al. .................. 711/103 |
| 2009/0094406 A1 * | 4/2009 | Ashwood ....................... 711/103 |
| 2009/0150894 A1 * | 6/2009 | Huang et al. .................... 718/104 |
| 2010/0036999 A1 * | 2/2010 | Zhuang et al. ................. 711/103 |
| 2010/0211833 A1 * | 8/2010 | Weingarten .................... 714/704 |

FOREIGN PATENT DOCUMENTS

EP 1840722 A 10/2007

* cited by examiner

*Primary Examiner* — Jared Rutz
(74) *Attorney, Agent, or Firm* — Baker Botts L.L.P.

(57) ABSTRACT

Systems and methods for reducing problems and disadvantages associated with wear leveling in storage devices are disclosed. A method may include maintaining module usage data associated with each of a plurality of storage device modules communicatively coupled to a channel. The method may also include maintaining device usage data associated with each of the plurality of storage devices associated with the storage device module for each of the plurality of storage device modules. The method may additionally include determining a particular storage device module of the plurality of storage device modules to which to store data associated with a write request based at least on the module usage data. The method may further include determining a particular storage device of the particular storage device module to which to store data associated with a write request based at least on the device usage data associated with the particular storage device module.

21 Claims, 3 Drawing Sheets

SYSTEM AND METHOD FOR HIERARCHICAL WEAR LEVELING IN STORAGE DEVICES

TECHNICAL FIELD

The present disclosure relates in general to improving wear among storage devices, and more particularly wear leveling in storage devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use one or more storage devices such as, for example, solid state storage devices (e.g., flash storage devices) and magnetic storage devices (e.g., hard disk drives and tape drives). In particular, flash devices have found increased use because they often provide faster input/output access than high-capacity hard disk drives, and also may provide an intermediate level of non-volatile caching between that of traditional volatile memories (e.g., dynamic random access memory or "DRAM") and non-volatile, long-term, high-capacity hard disk drives.

However, a problem related to the use of storage devices is known as "wear out" in which a particular storage device may lose functionality due to repeated use. Wear out is a particular problem in flash devices, as flash devices often wear out after a smaller number of write cycles as compared to DRAM. A common approach to mitigating wear out problems is wear leveling where an attempt is made to keep the number of erase/write cycles equal across all devices within a flash module.

Because of their advantages, flash modules similar to DRAM dual in-line memory modules (DIMMs) are becoming more prevalent. For instance, such flash modules are becoming more prevalent in non-uniform memory access (NUMA) memory architectures. In traditional NUMA architectures, an information handling system may include multiple processors, wherein in each processor may access its own local memory faster than memory local to another processor or memory shared between processors. Accordingly, if flash modules are incorporated into an architecture similar to that of a NUMA architecture, each processor in a multi-processor system may access its own associated or "local" flash modules, as well as flash modules associated with other processors or flash modules shared between processors, and a processor may be able to access its own associated flash modules faster than other non-local flash modules. Thus, a processor using a non-local flash module may suffer a performance penalty. In such an architecture, wear leveling may become more complex, as there may be a need to balance wear with performance.

SUMMARY

In accordance with the teachings of the present disclosure, the disadvantages and problems associated with wear out in storage devices have been substantially reduced or eliminated.

In an embodiment of the present disclosure, a method for wear leveling of a storage system having a plurality of storage device modules is provided. The method may include maintaining module usage data associated with each of a plurality of storage device modules communicatively coupled to a channel, the module usage data including information regarding a volume of writes made to each of the plurality of storage device modules and each of the plurality of storage device modules having a plurality of storage devices. The method may also include maintaining device usage data associated with each of the plurality of storage devices associated with the storage device module for each of the plurality of storage device modules, the device usage data including information regarding a volume of writes made to each of the plurality of storage devices. The method may additionally include determining a particular storage device module of the plurality of storage device modules to which to store data associated with a write request based at least on the module usage data. The method may further include determining a particular storage device of the particular storage device module to which to store data associated with a write request based at least on the device usage data associated with the particular storage device module.

In another embodiment of the present disclosure a system for wear leveling of a storage system having a plurality of storage device modules may include a plurality of storage device modules and a channel controller communicatively coupled to the plurality of storage device modules via a channel. Each storage device module may include a plurality of storage devices and a module controller configured to maintain device usage data associated with each of the plurality of storage devices, the device usage data including information regarding a volume of writes made to each of the plurality of storage devices. The channel controller may be configured to maintain module usage data associated with each of a plurality of storage device modules communicatively coupled to the channel, the module usage data including information regarding a volume of writes made to each of the plurality of storage device modules and determine a particular storage device module of the plurality of storage device modules to which to store data associated with a write request based at least on the module usage data. Each module controller may also be configured to determine a particular storage device of its associated storage device module to which to store data associated with a write request based at least on the device usage data associated with the particular storage device module.

In a further embodiment of the present disclosure, an information handling system may include at least one processor, a memory communicatively coupled to the at least one processor, a plurality of storage device modules communicatively coupled to the at least one processor via a channel, and a channel controller communicatively coupled to the plurality of storage device modules. Each storage device module may include a plurality of storage devices and a module controller configured to maintain device usage data associated with each of the plurality of storage devices, the device usage data including information regarding a volume of writes made to each of the plurality of storage devices. The channel controller may be configured to maintain module usage data associated with each of a plurality of storage device modules communicatively coupled to the channel, the module usage data including information regarding a volume of writes made to each of the plurality of storage device modules and determine a particular storage device module of the plurality of storage device modules to which to store data associated with a write request based at least on the module usage data. Each module controller may also be configured to determine a particular storage device of its associated storage device module to which to store data associated with a write request based at least on the device usage data associated with the particular storage device module.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
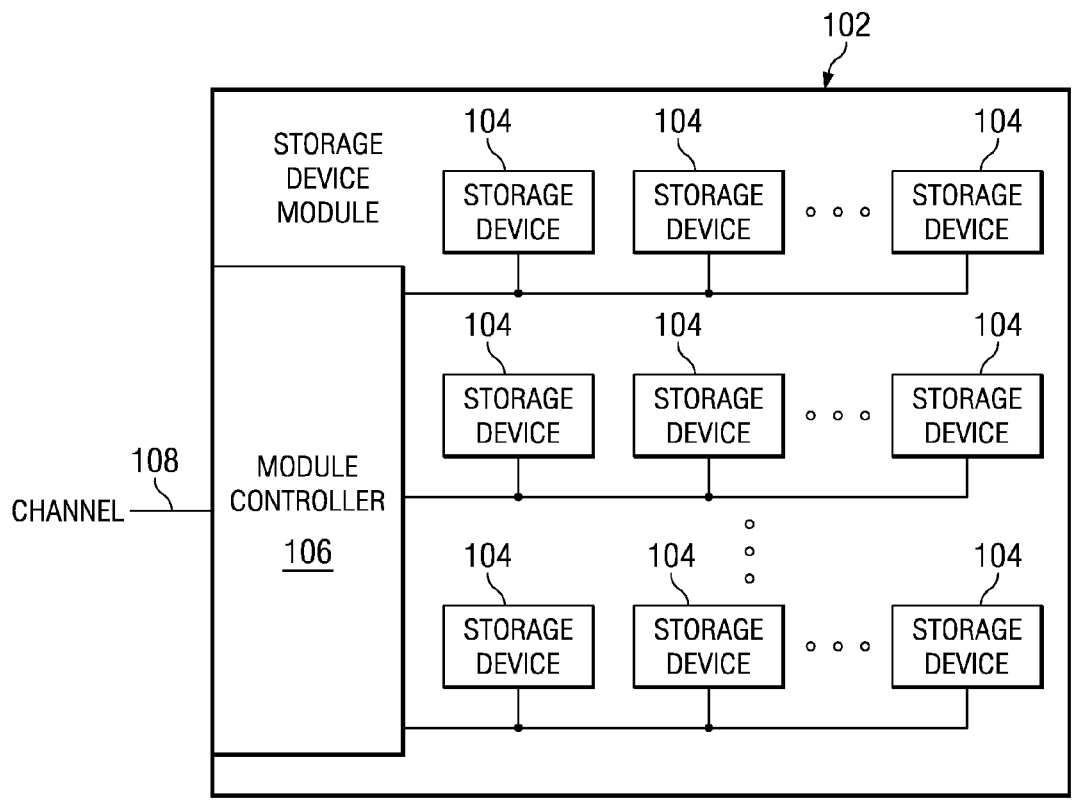
FIG. 1 illustrates a block diagram of a an example storage device module incorporating wear leveling functionality, in accordance with certain embodiments of the present disclosure.

FIG. 1 illustrates a block diagram of an example storage device module 102 incorporating wear leveling functionality, in accordance with certain embodiments of the present disclosure. Storage device module 102 may include any suitable system or apparatus configured to hold one or more storage devices 104 (e.g., a USB flash drive, an inline module including one or more storage devices, etc.). As depicted in FIG. 1, storage device module 102 may include one or more storage devices 104, and module controller 106. Each storage device 104 may include any suitable device, system, or apparatus configured to store data, including, for example, magnetic storage media (e.g., a hard disk drive) and solid state storage media (e.g, flash). Module controller 106 may be communicatively coupled to storage devices 104 and may include any device, system or apparatus configured to arrange data received via channel 108 such that writes and/or erasures are distributed substantially evenly among storage devices 104, in order to reduce wear and prolong the service life of the storage devices 104. In certain embodiments, device wear leveling module 106 may perform leveling in a manner similar to disclosed in U.S. Pat. No. 6,850,443. In addition, module controller 106 may be configured to maintain and/or keep track of the usage and/or expected remaining life of storage devices 104, individually and/or collectively, and communicate such information to a processor or other device, as is described in greater detail below.

Figure 2:
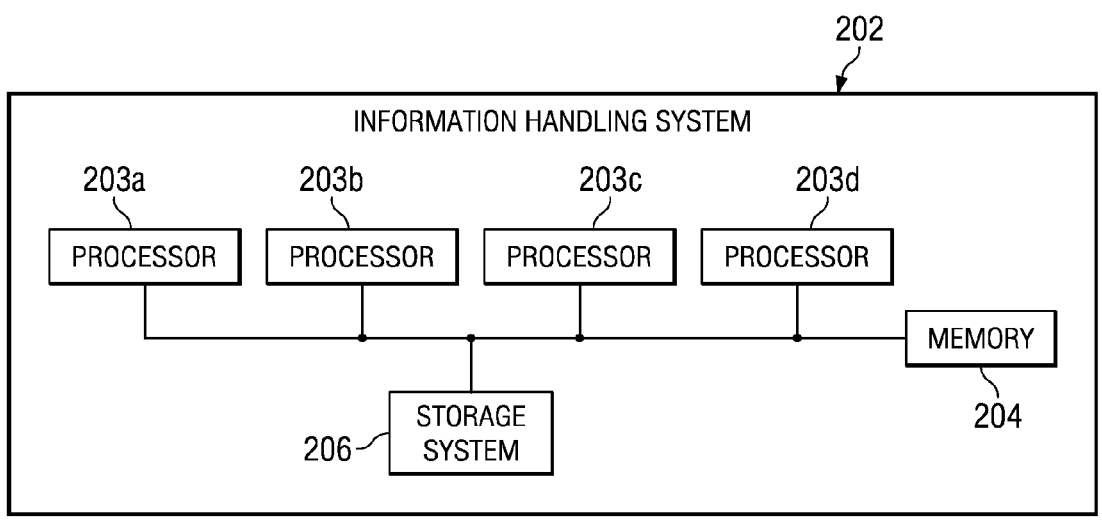
FIG. 2 illustrates a block diagram of an example information handling system including wear leveling of storage devices, in accordance with certain embodiments of the present disclosure.

FIG. 2 illustrates a block diagram of an example information handling system 202 including wear leveling of storage devices 102, in accordance with certain embodiments of the present disclosure. In certain embodiments, information handling system 202 may be a computer, such as a desktop computer or portable computer (e.g., a "laptop" or "notebook"), for example. In other embodiments, information handling system 202 may be a server. As depicted in FIG. 2, information handling system 202 may comprise one or more processors 203, a memory 204 communicatively coupled to processors 203, and a storage system 206 communicatively coupled to processor 203.

Each processor 203 may comprise any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, each processor 203 may interpret and/or execute program instructions and/or process data stored in memory 204, storage system 206 and/or another component of information handling system 202. For the purpose of clarity and exposition, information handling system 202 is depicted in FIG. 2 as having four processors 203. However, information handling system 204 may include any suitable number of processors 203.

Memory 204 may be communicatively coupled to processors 203 and may comprise any system, device, or apparatus configured to retain program instructions or data for a period of time (e.g., computer-readable media). Memory 204 may comprise random access memory (RAM), electrically erasable programmable read-only memory (EEPROM), a PCM-CIA card, flash memory, magnetic storage, opto-magnetic storage, or any suitable selection and/or array of volatile or non-volatile memory that retains data after power to information handling system 202 is turned off. For the purpose of clarity and exposition, information handling system 202 is depicted in FIG. 2 as having one memory 204. However, information handling system 202 may include any suitable number of memories 204.

Figure 3:
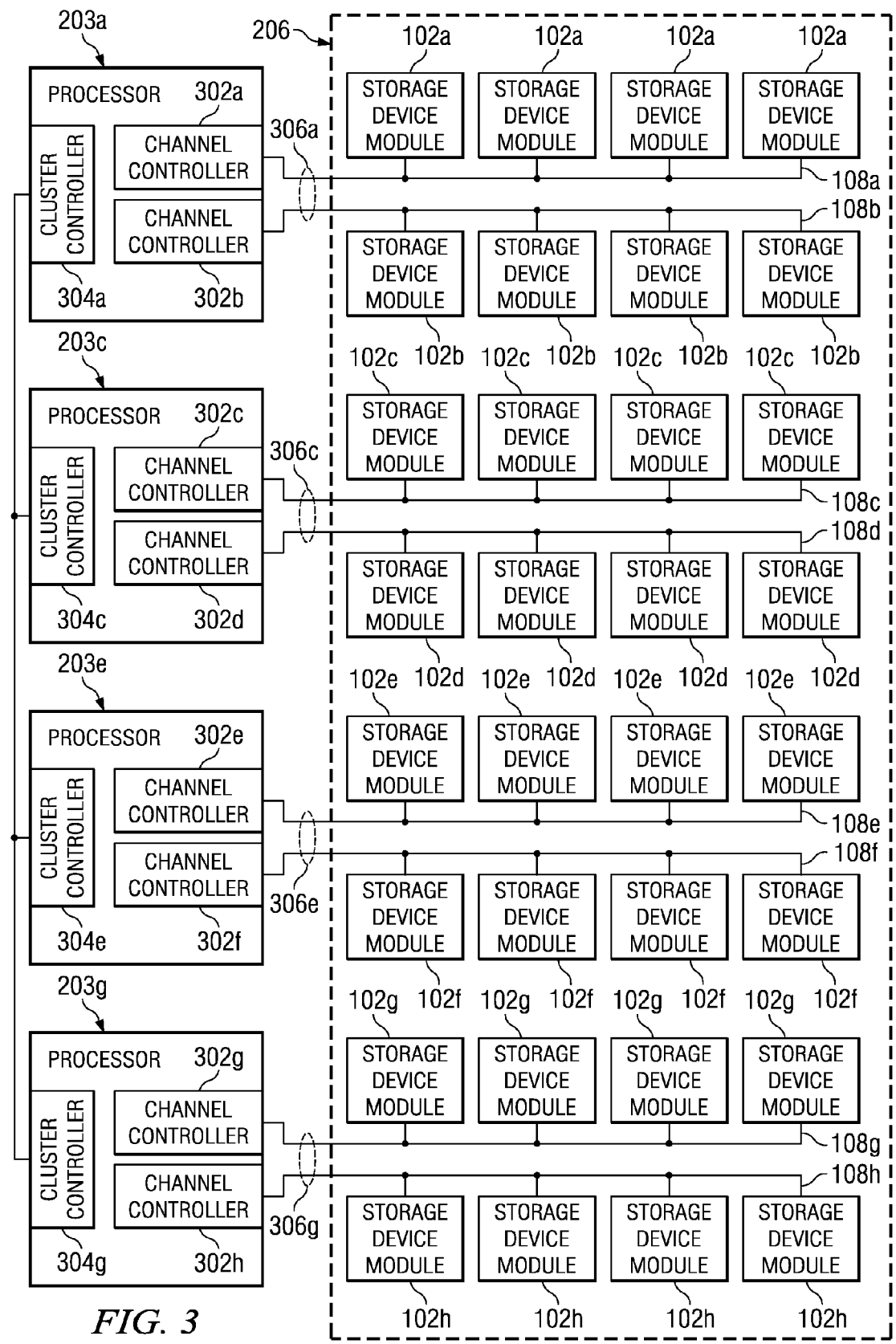
FIG. 3 illustrates a simplified overview of a wear leveling hierarchy of the information handling system depicted in FIG. 2, in accordance with certain embodiments of the present disclosure.

Storage system 206 may include any suitable system, device or apparatus including one or more storage device 104 and/or storage devices modules 102 (e.g., as depicted in FIG. 3). In operation, processor 203 may communicate data to and/or read data from storage system 206 and/or one or more of its components.

For the purposes of exposition, the wear-leveling techniques discussed herein are applied to storage system 206. However, the methods and systems disclosed herein may be applied to any system, device, apparatus, and/or instrumentality for which wear leveling may be beneficial, including, without limitation, memory 204 and/or its components.

FIG. 3 illustrates a simplified overview of a wear leveling hierarchy of information handling system 202, in accordance with certain embodiments of the present disclosure. As depicted in FIG. 3, storage system 206 may include one or more storage device modules 102. In addition, each processor 203 may be associated with one or more associated storage device modules 102. Storage device modules 102 associated with a particular processor 203 may also be said to be "local" to the particular processor 203. For example, as depicted in FIG. 3, storage device modules 102a and 102b (e.g., those coupled via channels 108a and 108b of cluster 306a) may be associated with or local to processor 203a, storage device modules 102c and 102d (e.g., those coupled via channels 108c and 108d of cluster 306c) may be associated with or local to processor 203c, storage device modules 102e and 102f (e.g., those coupled via channels 108e and 108f of cluster 306e) may be associated with or local to processor 203e, storage device modules 102g and 102h (e.g., those coupled via channels 108g and 108h of cluster 306g) may be associated with or local to processor 203g.

As also depicted in FIG. 3, each processor 203 may be coupled to its associated storage device modules via one or more channels 108. For example, processor 203a may be coupled to storage device modules 102a via channel 108a and storage device modules 102b via channel 108b (e.g., those channels of cluster 306a). Similarly: (i) processor 203c may be coupled to storage device modules 102c via channel 108c and storage device modules 102d via channel 108d (e.g., those channels of cluster 306c); (ii) processor 203e may be coupled to storage device modules 102e via channel 108e and storage device modules 102f via channel 108f (e.g., those channels of cluster 306e); and (iii) processor 203g may be coupled to storage device modules 102g via channel 108g and storage device modules 102h via channel 108h (e.g., those channels of cluster 306g).

In the hierarchy set forth in FIG. 3, each processor 203 may have input/output access to (e.g., may be able to store data to and/or read data from) each storage device module 102. However, each processor 203 may have faster input/access to those storage device modules 102 associated with and/or local to such processor 203. Thus, as an example, processor 203a may have faster access to storage device modules 102a and 102b, as compared to its access to storage device modules 102c-102h.

In operation, each module controller 106 of storage device modules 102 may be configured to arrange data received by its respective storage device module 102 such that writes and/or erasures are distributed substantially evenly among storage devices 104 of the particular storage device module 102. In addition, each module controller 106 may be configured to maintain and/or keep track of the usage and/or expected remaining life of individual storage devices 104 of the storage device module 102 associated with such module controller 106 (e.g., by tracking reads and/or erasures communicated to individual storage devices 104), may control reads and/or erasures to the individual storage devices 104 associated with respective storage device module 102, and/or may communicate such information to a channel controller 302 associated with the channel 108 by which the storage device module 102 is coupled to a processor 203. For example, a module controller 106 associated with a storage device module 102a may communicate such information via channel 108a to channel controller 302a.

Similarly, each channel controller 302 may be configured to arrange data communicated to its respective channel 108 such that writes and/or erasures are distributed substantially evenly among storage device modules 102 associated with the particular channel 108. In addition, each channel controller 302 may be configured to maintain and/or keep track of the usage and/or expected remaining life of individual storage devices 104 and/or storage device modules 102 associated with such channel controller 302 (e.g., by tracking reads and/erasures communicated to individual storage device modules 102 and/or information communicated to such channel controller 302 by module controllers 106), may control reads and/or erasures to the individual storage device modules 102 associated with such channel controller 302, and/or may communicate such information to a cluster controller 304 (and/or another suitable component) associated with the processor 203 for which channel controller 302 is associated. For example, channel controller 302a associated with storage device modules 102a may communicate such information to cluster controller 304a.

Also similarly, each cluster controller 304 may be configured to arrange data communicated to each channel 108 associated such cluster controller's respective cluster 306 such that writes and/or erasures are distributed substantially evenly among channels 108 associated with (e.g., local to) the respective cluster 306. In addition, each cluster controller 304 may be configured to maintain and/or keep track of the usage and/or expected remaining life of individual storage devices 104 and/or storage device modules 102 associated with such cluster 306 (e.g., by tracking reads and/erasures communicated to individual channels 108 and/or information communicated to such cluster controller 304 by channel controllers 302), may control reads and/or erasures to the individual channels 108 associated with such cluster 306, and/or may communicate such information to an operating system executing on information handling system 202 or a suitable component of information handling system 202. An operating system executing on information handling system 202 may also allocate reads and/or erasures among clusters 306a, so as to provide yet another layer of wear leveling hierarchy.

Although each of module controllers 106, channel controllers 302, and cluster controllers 304 have been discussed above as if such components comprise hardware components, any of module controllers 106, channel controllers 302, and cluster controllers 304 may be implemented in hardware, firmware, software embodied on a computer-readable medium and executable by a processor, or any combination thereof. For example, in certain embodiments, one or more of module controllers 106, channel controllers 302, and cluster controllers 304 may be implemented by software drivers.

Figure 4:
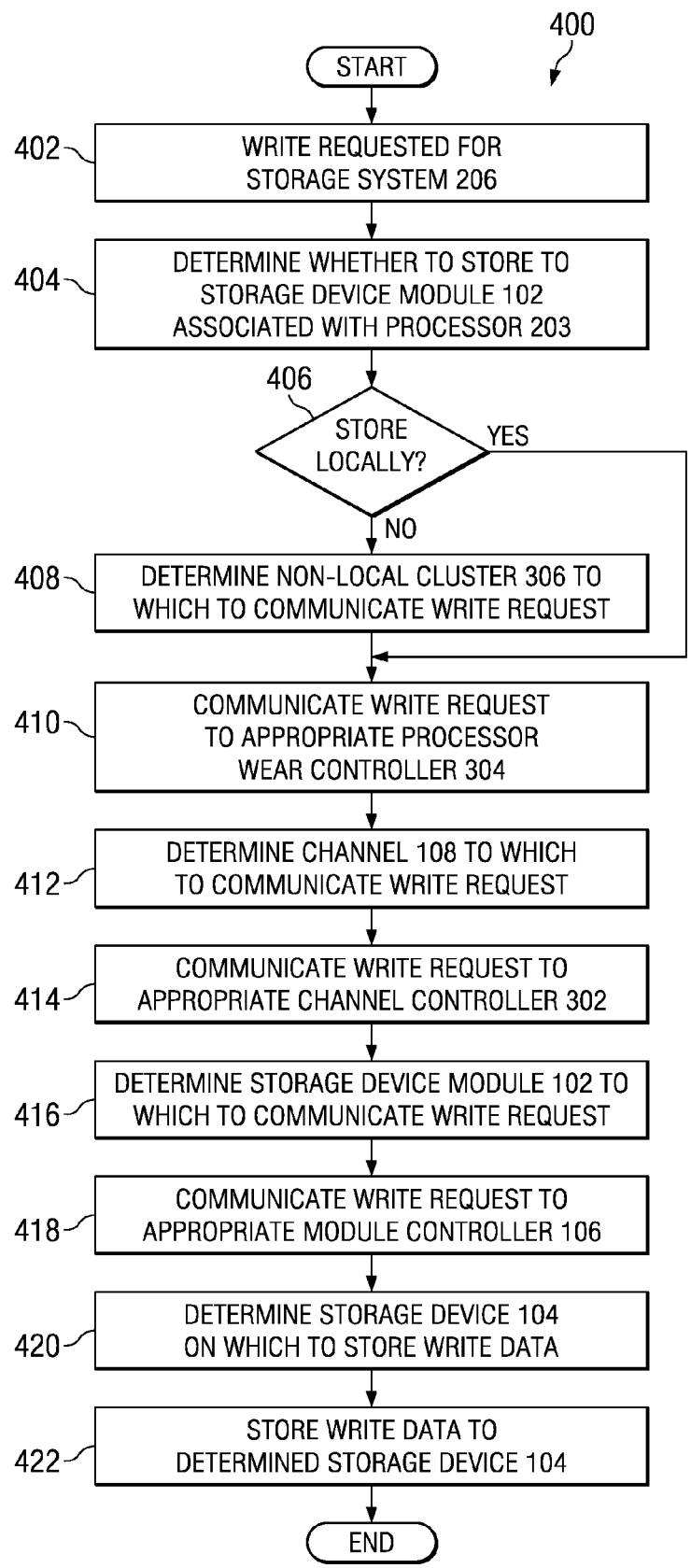
FIG. 4 illustrates a block diagram of an example method for completing a write request to a storage system, in accordance with certain embodiments of the present disclosure.

FIG. 4 illustrates a block diagram of an example method 400 for completing a write request to storage system 206, in accordance with certain embodiments of the present disclosure.

According to one embodiment, method 400 preferably begins at step 402. As noted above, teachings of the present disclosure may be implemented in a variety of configurations of information handling system 202. As such, the preferred initialization point for method 400 and the order of the steps 402-422 comprising method 400 may depend on the implementation chosen.

At step 402, a write may be requested for storage system 206. For example, an operating system or application program executing on one of processors 203 may request data to be written to storage system 206.

At step 404, an operating system or application program executing on one of processors 203, and/or cluster controller 304 associated with the particular processor 203 upon which the operating system or application program is executing, may determine whether to store to a storage device module 102 associated with (e.g., local to) the particular processor 203. For example, the determination may be made based at least on data regarding previous usage or expected remaining life of storage device modules 102 and/or storage devices 104 local to processor 203 compared to that of other storage device modules 102 and/or storage devices 104 not local to processor 203. In some embodiments, such determination may balance the expected remaining life of local storage devices 104 local to processor 203 with any expected performance penalty associated with performing a write to non-local storage devices 104.

At step 406, if it is determined that the data associated with the write request shall be stored locally (e.g., the cluster 306 associated with the particular processor 203 upon which the write request is associated), method 400 may proceed to step 410. Otherwise, if the data associated with the write request shall be stored non-locally, method 400 may proceed to step 408.

At step 408, in response to a determination that data associated with a write request shall be stored on a storage device 104 non-local to a particular processor 203, an operating system or application program executing on one of processors 203, and/or a cluster controller 304 associated with a processor 203, may determine the non-local cluster 306 to which data associated with the write request may be stored. For example, the determination may be made based at least on data regarding previous usage or expected remaining life of storage device modules 102 and/or storage devices 104 associated with non-local clusters 306. In certain embodiments, such determination may be made by analyzing and/or processing wear information communicated from a cluster controller 304 to an operating system and/or application executing on a processor 203.

At step 410, in response to determining a cluster 306 to which the write request may be stored, an operating system or application program executing on one of processors 203, may communicate the write request to a cluster controller 304 associated with the determined cluster 306.

At step 412, the particular cluster controller 304 may determine an associated channel 108 to which to communicate the write request. For example, the determination may be made based at least on data regarding previous usage or expected remaining life of storage device modules 102 and/or storage devices 104 associated with the channels 108 associated with the particular cluster controller. In certain embodiments, such determination may be made by analyzing and/or processing wear information communicated from a channel controller 302 to a cluster controller 304.

At step 414, the particular cluster controller 304 may communicate the write request to a channel controller 302 associated with the determined channel 108.

At step 416, the particular channel controller 302 may determine an associated storage device module 102 to which to communicate the write request. For example, the determination may be made based at least on data regarding previous usage or expected remaining life of storage device modules 102 and/or storage devices 104 associated with the particular channel 108. In certain embodiments, such determination may be made by analyzing and/or processing wear information communicated from a module controller 106 to a channel controller 302.

At step 418, the particular channel controller 302 may communicate the write request to a module controller 106 associated with the determined storage device module 102.

At step 420, the module controller 106 may determine an associated storage device 104 to which to communicate the write request. For example, the determination may be made based at least on data regarding previous usage or expected remaining life of storage devices 104 associated with the storage device module 102. In certain embodiments, such determination may be made by analyzing and/or processing wear information communicated from individual storage devices 104 to a module controller 106.

At step 422, the data associated with the write request may be stored to the determined storage device 104. After completion of step 422, method 400 may end.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software embodied in computer-readable media.

Using the methods and systems disclosed herein, problems associated with conventional approaches to reducing wear associated with storage devices, in particular flash storage, may be improved, reduced, or eliminated. For example, methods and systems disclosed herein may provide a hierarchical wear-leveling approach to distribute wear leveling at the processor level, cluster level and the channel level, in addition at the storage device module level.

Although the present disclosure has been described in detail, it should be understood that various changes, substitutions, and alterations can be made hereto without departing from the spirit and the scope of the disclosure as defined by the appended claims.

What is claimed is:

1. A method for wear leveling of a storage system having a plurality of storage device modules, the method comprising:
maintaining module usage data associated with each of a plurality of storage device modules communicatively coupled to a channel, the module usage data including information regarding a volume of writes made to each of the plurality of storage device modules and each of the plurality of storage device modules having a plurality of storage devices;
maintaining channel usage data associated with each of a plurality of channels, the channel usage data including information regarding a volume of writes made to each of the plurality of channels and each of the plurality of channels communicatively coupled to a plurality of storage device modules;
for each of the plurality of storage device modules, maintaining device usage data associated with each of the plurality of storage devices associated with the storage device module, the device usage data including information regarding a volume of writes made to each of the plurality of storage devices;
determining a particular storage device module of the plurality of storage device modules to which to store data associated with a write request based at least on the module usage data;
determining a particular storage device of the particular storage device module to which to store data associated with a write request based at least on the device usage data associated with the particular storage device module; and
determining a particular channel of the plurality of channels to which to store data associated with a write request based at least on the channel usage data.

2. A method according to claim 1, wherein at least one of the plurality of storage devices includes a flash device.

3. A method according to claim 1, further comprising:
maintaining cluster usage data associated with each of a plurality of clusters of channels, the cluster usage data including information regarding a volume of writes made to clusters communicatively and each of the plurality of clusters communicatively coupled to a processor; and
determining a particular cluster of the plurality of clusters to which to store data associated with a write request based at least on the cluster usage data.

4. A method according to claim 3, further comprising:
determining a source processor upon which a program of instructions associated with the write request is executing; and
wherein the particular cluster is determined based at least on the determined source processor.

5. A method according to claim 4, wherein the particular cluster is determined based at least on an expected performance penalty associated with performing the write request to a cluster non-local to the source processor.

6. A system for wear leveling of a storage system having a plurality of storage device modules, the system comprising:
a plurality of storage device modules, each storage device module having:
a plurality of storage devices; and
a module controller configured to maintain device usage data associated with each of the plurality of storage devices, the device usage data including information regarding a volume of writes made to each of the plurality of storage devices;
a channel controller communicatively coupled to the plurality of storage device modules via a channel and configured to:
maintain module usage data associated with each of a plurality of storage device modules communicatively coupled to the channel, the module usage data including information regarding a volume of writes made to each of the plurality of storage device modules; and
determine a particular storage device module of the plurality of storage device modules to which to store data associated with a write request based at least on the module usage data; and
a cluster controller communicatively coupled to a plurality of channels and configured to:
maintain channel usage data associated with each of the plurality of channels communicatively coupled to a processor, the channel usage data including information regarding a volume of writes made to each of the plurality of channels and each of the plurality of channels communicatively coupled to a plurality of storage device modules; and
determine a particular channel of the plurality of channels to which to store data associated with a write request based at least on the channel usage data;
wherein each module controller is also configured to determine a particular storage device of its associated storage device module to which to store data associated with a write request based at least on the device usage data associated with the particular storage device module.

7. A system according to claim 6, wherein at least one of the plurality of storage devices includes a flash device.

8. A system according to claim 6, wherein the channel controller is implemented by a program of instructions embodied on a computer-readable medium.

9. A system according to claim 6, wherein the cluster controller is implemented by a program of instructions embodied on a computer-readable medium.

10. A system according to claim 6, further comprising a program of instructions embodied on computer-readable media and operable to, when executed:
maintain cluster usage data associated with each of a plurality of clusters of channels, the cluster usage data including information regarding a volume of writes made to clusters communicatively and each of the plurality of clusters communicatively coupled to a processor; and
determine a particular cluster of the plurality of clusters to which to store data associated with a write request based at least on the cluster usage data.

11. A system according to claim 10, the program of instructions further operable to, when executed:
determine a source processor upon which a program of instructions associated with the write request is executing; and
wherein the particular cluster is determined based at least on the determined source processor.

12. A system according to claim 11, wherein the particular cluster is determined based at least on an expected performance penalty associated with performing the write request to a cluster non-local to the source processor.

13. An information handling system comprising:
at least one processor;
a memory communicatively coupled to the at least one processor;
a plurality of storage device modules communicatively coupled to the at least one processor via a channel, each storage device module having:

a plurality of storage devices; and a module controller configured to maintain device usage data associated with each of the plurality of storage devices, the device usage data including information regarding a volume of writes made to each of the plurality of storage devices;

a channel controller communicatively coupled to the plurality of storage device modules and configured to:

maintain module usage data associated with each of a plurality of storage device modules communicatively coupled to the channel, the module usage data including information regarding a volume of writes made to each of the plurality of storage device modules; and determine a particular storage device module of the plurality of storage device modules to which to store data associated with a write request based at least on the module usage data; and a cluster controller communicatively coupled to a plurality of channels and configured to:

maintain channel usage data associated with each of the plurality of channels communicatively coupled to a processor, the channel usage data including information regarding a volume of writes made to each of the plurality of channels and each of the plurality of channels communicatively coupled to a plurality of storage device modules; and determine a particular channel of the plurality of channels to which to store data associated with a write request based at least on the channel usage data;

wherein each module controller is also configured to determine a particular storage device of its associated storage device module to which to store data associated with a write request based at least on the device usage data associated with the particular storage device module.

14. An information handling system according to claim 13, wherein at least one of the plurality of storage devices includes a flash device.

15. An information handling system according to claim 13, wherein the channel controller is implemented by a program of instructions embodied on a computer-readable medium.

16. An information handling system according to claim 13, wherein the channel controller is an integral part of the processor.

17. An information handling system according to claim 13, wherein the cluster controller is implemented by a program of instructions embodied on a computer-readable medium.

18. An information handling system according to claim 13, wherein the cluster controller is an integral part of the processor.

19. An information handling system according to claim 13, further comprising:

a plurality of processors; and a program of instructions embodied on computer-readable media and operable to, when executed:

maintain cluster usage data associated with each of a plurality of clusters of channels, the cluster usage data including information regarding a volume of writes made to clusters communicatively and each of the plurality of clusters communicatively coupled to a respective processor of the plurality of processors; and determine a particular cluster of the plurality of clusters to which to store data associated with a write request based at least on the cluster usage data.

20. An information handling system according to claim 19, the program of instructions further operable to, when executed:

determine a source processor of the plurality of processors upon which a program of instructions associated with the write request is executing; and wherein the particular cluster is determined based at least on the determined source processor.

21. An information handling system according to claim 20, wherein the particular cluster is determined based at least on an expected performance penalty associated with performing the write request to a cluster non-local to the source processor.

* * * * *